No. 737,856. PATENTED SEPT. 1, 1903.
J. H. McDANIEL.
COMBINED SEED PLANTER AND FERTILIZER DISTRIBUTER.
APPLICATION FILED SEPT. 10, 1902.
NO MODEL. 3 SHEETS—SHEET 1.
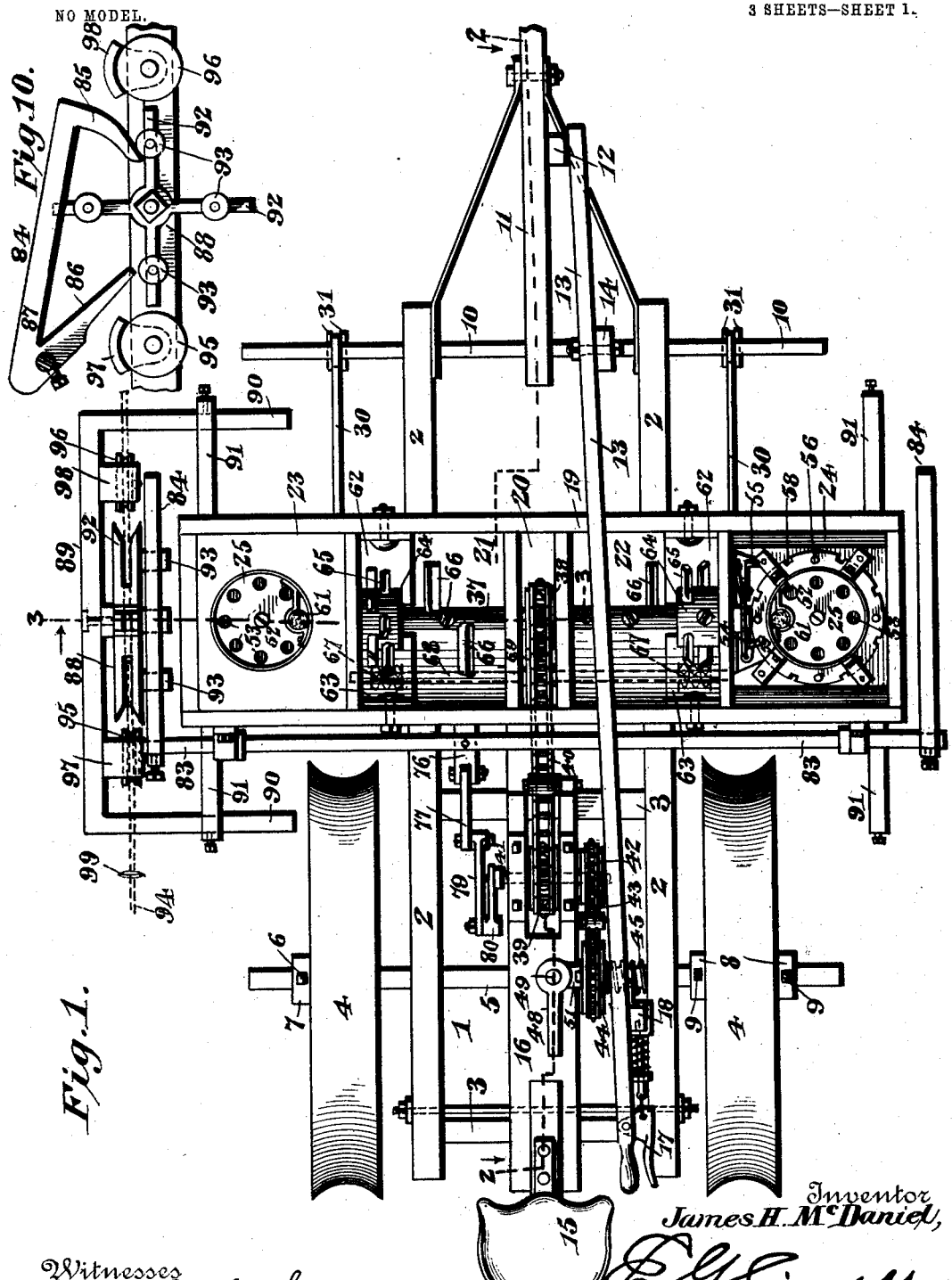
Witnesses
Jas. K. McCathran
Louis G. Julihn
Inventor
James H. McDaniel,
Attorney No. 737,856. PATENTED SEPT. 1, 1903.
J. H. McDANIEL.
COMBINED SEED PLANTER AND FERTILIZER DISTRIBUTER.
APPLICATION FILED SEPT. 10, 1902.
NO MODEL. 3 SHEETS—SHEET 2.
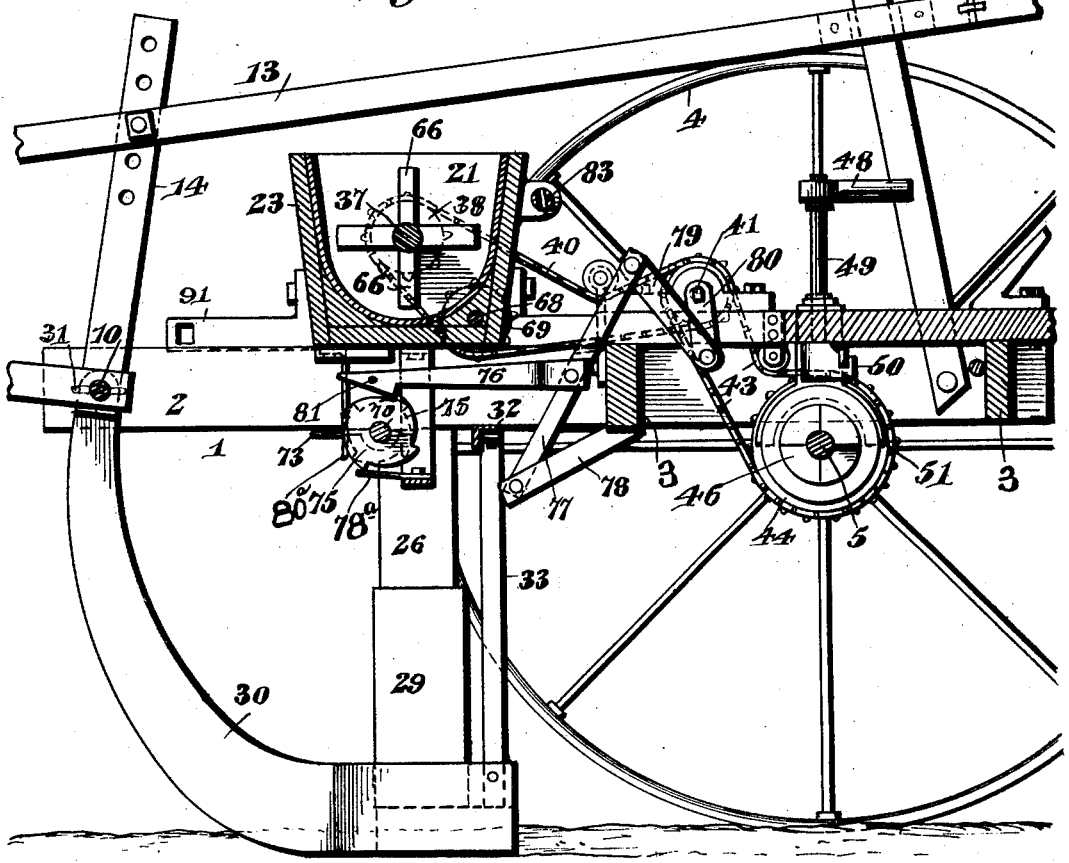
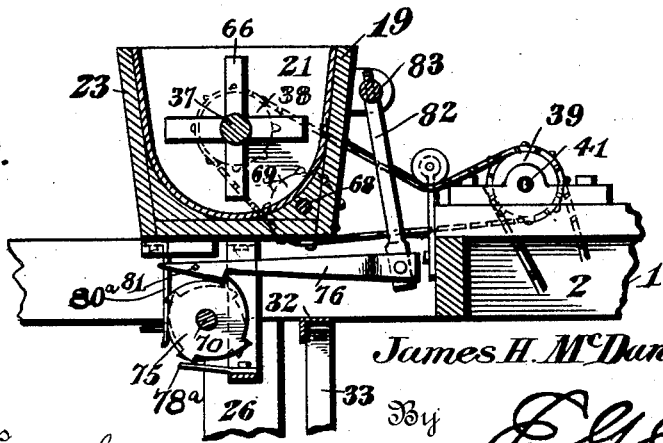
Witnesses
Jas. T. McCathran
Louis G. Julihn
James H. McDaniel, Inventor
By E. G. Siggers
Attorney

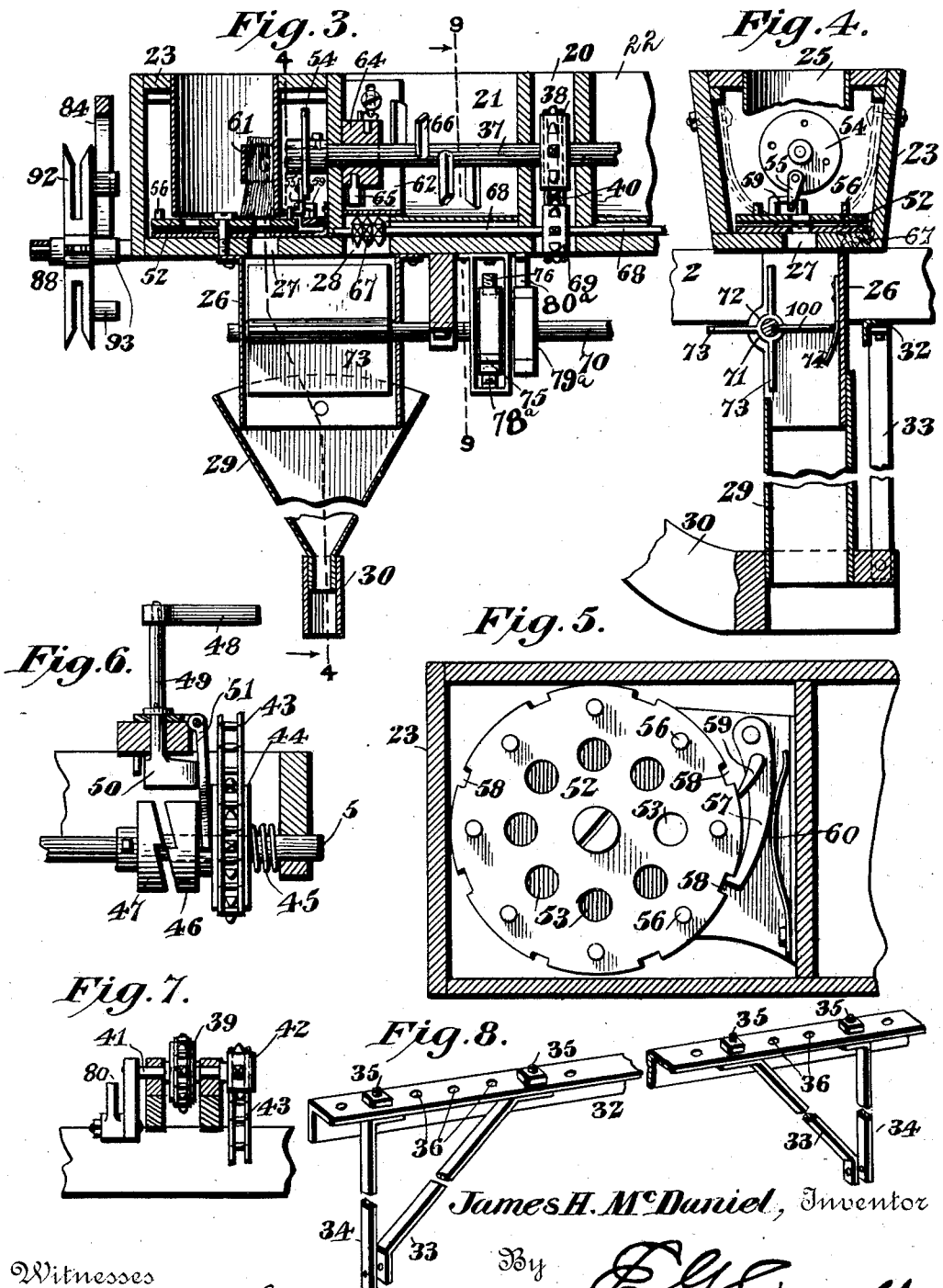

No. 737,856. Patented September 1, 1903.

UNITED STATES PATENT OFFICE.

JAMES H. McDANIEL, OF MILLSAP, TEXAS.

COMBINED SEED-PLANTER AND FERTILIZER-DISTRIBUTER.

SPECIFICATION forming part of Letters Patent No. 737,856, dated September 1, 1903.

Application filed September 10, 1902. Serial No. 122,845. (No model.)

*To all whom it may concern:*

Be it known that I, JAMES H. MCDANIEL, a citizen of the United States, residing at Millsap, in the county of Parker and State of Texas, have invented a new and useful Combined Seed-Planter and Fertilizer-Distributer, of which the following is a specification.

This invention relates to a combined seed-planter and fertilizer-distributer, and has for its object to produce an agricultural implement of this class which can be readily adapted for strewing or for check-row planting with or without a wire, whereby it may be employed with equal facility for the planting of a large variety of seeds either with or without a simultaneous distribution of fertilizer.

A further object of the invention is to improve the seed and fertilizer feeding mechanisms and the means for properly regulating the operation thereof in accordance with the quantity to be deposited in the hills and to likewise improve the dropping mechanism and the means whereby the same may be operated from the carrying-wheels or from an actuating member operated by contact with the check-row buttons as the machine advances across a field.

To the accomplishment of these and other objects, all as will hereinafter more fully appear, the invention in its preferred embodiment resides in the construction and arrangement of parts to be described, illustrated in the accompanying drawings, and defined in the appended claims.

In said drawings, Figure 1 is a plan view of the machine complete. Fig. 2 is a longitudinal sectional view on the line 2 2 of Fig. 1. Fig. 3 is a vertical sectional view on the line 3 3 of Fig. 1. Fig. 4 is a vertical section on the line 4 4 of Fig. 3. Fig. 5 is a horizontal section through one of the seedboxes, showing in plan the feed-disk and its dog. Fig. 6 is a detail view of the machine-clutch and its operating device. Fig. 7 is a detail view through a portion of the gearing. Fig. 8 is a detail perspective view of the rear runner-support. Fig. 9 is a sectional view on the line 9 9 of Fig. 3, showing the arrangement for operating the dropper-shaft from the check-wire; and Fig. 10 is a detail view of the vibrator and its operating mechanism.

Like numerals of reference are employed to designate corresponding parts throughout the several views.

The frame 1 of the machine comprises a pair of parallel beams 2, connected by transverse beams 3, and is supported by the usual carrying-wheels 4, mounted upon an axle 5, journaled in suitable bearings adjacent to the rear end of the frame. Independent rotation of the wheels in making a turn is provided for by adjustably securing one of the wheels to the axle—as, for instance, by a set-screw 6, passed through the hub 7 of the wheel—and by mounting the other of said wheels loosely upon the axle between a pair of adjustable collars 8, secured to the axle by set-screws 9. At the front end of the frame is a transverse draft-bar 10, to which is attached the rear end of the tongue 11. To the tongue is secured a short post 12 for the attachment of the front end of a lever 13, having adjustable connection with a post 14, upstanding from the bar 10. The lever 13 extends to the rear end of the machine to be within easy access from the driver's seat 15, supported above a central beam 16, constituting a part of the frame structure. The lever 13 is provided with the usual spring-latch 17, engaging a rack 18, and is designed to change the angular relation between the tongue and the frame in a manner well understood in the art for the purpose of raising or lowering the runners or furrow-openers, to be hereinafter described.

In advance of the carrying-wheels the frame 1 supports a comparatively long transversely-disposed trough-shaped receptacle 19, divided by partitions to define a central gear-case 20, a pair of fertilizer-boxes 21 and 22, and end compartments 23 and 24, in which latter are disposed cylindrical seedboxes 25, designed for the reception of corn or other seeds. Below the receptacle 19 are disposed seed-tubes 26, above each of which are located a pair of openings 27 and 28 in the bottom walls of the adjacent seed and fertilizer compartments, the opening 28 being located at the outer end of the fertilizer-box, as shown in Fig. 3. At the bottom of each seed-tube is disposed a pivotally-supported shoe or conductor 29, disposed to be swung laterally to accommodate the adjustment of the runners 30, having bifurcated rear ends which receive the reduced lower ends of the hopper-shaped shoes 29. The front ends of the runners are adjustable upon the draft-bar 10 and are secured in their adjusted positions by pins 31, passed through the draft-bar, as indicated in Figs. 1 and 2. The retention of the rear ends of the runners is effected by what may be termed a "runner-support." This support comprises an angle-bar 32, secured to the under side of the frame, as indicated in Fig. 2, and pendent brace-rods 33 and 34, the lower ends of which are bolted or otherwise secured to the rear ends of the runners. These brace-rods, a pair of which are provided for each runner, as best shown in Fig. 8, are adjustably secured to the angle-bar 32 by bolts 35, passed through suitable openings 36 in the bar, said openings being arranged in series to permit the attachment of the brace-rods at any desired point in accordance with the desired adjustment of the runners. It will thus be seen that the interval between the rows may be regulated by the lateral adjustment of the runners, which adjustment is accommodated by the swinging of the shoes 29.

Extending through the fertilizer-boxes 21 and 22 and terminating just within the end compartments 23 and 24 of the receptacle 19 is a feed-shaft 37, journaled in the several partitions and provided with a sprocket-wheel 38 within the gear-case 20. This feed-shaft is designed to be rotated from the axle 5, and while any desired character of intermediate gearing may be employed I prefer to gear the wheel 38 upon the shaft 37 with a similar sprocket-wheel 39 through the medium of a sprocket-chain 40. The wheel 39 is mounted on a short shaft 41, journaled in suitable bearings upstanding from the beam 16, and upon said shaft is keyed a somewhat smaller sprocket-wheel 42, geared by a chain 43 to a somewhat larger sprocket-wheel 44, loosely mounted on the axle 5. The wheel 44 (see Fig. 6) is urged by a spring 45 to present the clutch-hub 46 of said wheel to a clutch-disk 47, fixed upon the axle. The clutch-hub 46 and clutch-disk 47 constitute the elements of the machine-clutch, which when the device is in use operatively connects the feed-shaft with the axle, so that the feeding mechanism will be operated by the advance of the machine. For the purpose of throwing the clutch out of gear when desired I provide a clutch-lever 48, secured to the upper end of a shaft 49, provided at its lower end with a cam 50, bearing against a swinging yoke 51, engaging the hub 46. It is obvious that by swinging the lever 48 the cam 50 will be moved to swing the yoke 51, and thus withdraw the clutch-hub 46 from engagement with the clutch-disk 47 against the resistance opposed to such movement by the spring 45.

Below each of the seedboxes 25 is mounted a rotary feed-disk 52, provided with an annular series of openings 53, designed to be brought successively into coincidence with the opening 27 to permit the gravitation of the seeds from the seed-disk to the subjacent seed-tube. A step-by-step advance is imparted to each feed-disk 52 from the feed-shaft 37, upon each end of which latter is mounted an actuating-disk 54, provided with one or more tappet-arms 55, disposed to successively engage pins or projections 56 upstanding from the feed-disks 52. When a tappet-arm is brought into contact with one of the pins or projections 56 through the rotation of the feed-shaft, it rotates the disk 52 to present one of the openings 53 therein over the opening 27, and this rotation of the disk presents the next succeeding pin in position to be engaged by the tappet-arm upon the next rotation of the shaft. It is desirable to lock the disks 52 after each movement thereof, and for this purpose I provide for each disk a swinging dog 57, disposed to engage peripheral notches 58 in said disk and provided with a trip-arm 59. As the tappet-arm moves toward a pin 56 of the disk it first strikes the trip-arm 59 of the dog to force the latter out of engagement with the disk and subsequently strikes the pin and advances the disk, the dog 57 being moved into engagement with the next succeeding notch by a spring 60 as soon as the disk has completed its movement and the tappet-arm moves out of engagement with the pin. If a more rapid feed is desired, it is simply necessary to mount other tappet-arms upon each actuating-disk 54, so that the feed-disk will be advanced the desired number of steps during each rotation of the feed-shaft. The openings 53 in the feed-disk constitute, in effect, pockets the capacity of which is just equal to the quantity of seeds desired to be dropped at each advance of the disk. In order, therefore, to prevent more than this predetermined quantity of seeds from dropping from the seedbox when one of the openings 53 is brought into coincidence with the opening 27, I provide within the seedbox a guard 61, having the form of a brush, retained in any suitable manner and located directly above the opening 27.

The size of the feed-opening 28 of each of the fertilizer-boxes 21 and 22 is regulated by a pair of adjustable semicircular gage-plates 62 and 63, and immediately above this opening the feed-shaft is provided with what may be termed a "feed-head" 64, which is, in effect, a cylindrical enlargement of the shaft and is provided with radial feed-blades 65, arranged in two closely-adjacent circumferential series. The blades of each series are disposed in alternating arrangement with those of the other series to produce a staggered arrangement, which is quite effective for the feeding of the fertilizer from the box to the tube 26 through the opening 28. For the purpose of continually stirring the fertilizer and for feeding it toward the outer end of the box I provide the shaft with what may be termed "propeller-blades" 66, disposed upon said shaft in spiral arrangement, so that as the feed-shaft rotates the contents of each of the boxes 21 and 22 will be constantly stirred and propelled toward the discharge-opening. The positive feeding of the fertilizer through the opening 28 is assured by a feed-roller 67, located within said opening and mounted on a shaft 68. This shaft is mounted in suitable bearings in the under side of the receptacle 19, and one of the rollers 67 is mounted on each end thereof for disposal within each of the openings 28 of the two fertilizer-boxes. At the center of the shaft 68 is keyed a sprocket-wheel 69, which, as is clearly shown in Fig. 2, is engaged by the sprocket-chain 40, so that when the machine is in motion the feed-shafts 37 and 68 will be rotated to effect the simultaneous feeding of seeds and fertilizer to each of the seed-tubes.

Having considered the feeding mechanism, I will next proceed with the description of the dropping mechanism, designed to be operated at intervals to drop the seeds and fertilizer previously fed to the seed-tubes in the manner already explained.

Journaled in suitable bearings in the under side of the frame is a transversely-disposed dropper-shaft 70, upon the opposite ends of which are mounted rotary droppers 71. Each dropper is located at the front side of one of the feed-tubes 26, the front wall of which is cut away, as shown in Fig. 4. These droppers each include a hub 72, mounted on the shaft 70, and a series of blades 73, extending radially from the hub and designed to extend successively across and close the seed-tube, (see Fig. 4,) the back wall of the tube being preferably provided with a yielding plate 74, which insures the closing of the opening through the tube and at the same time prevents binding of the blades against the back wall of the tube when the dropper is rotated. It will now be observed that if the droppers are in the position indicated in Fig. 4 of the drawings and the feeding mechanism is operated a suitable quantity of seeds and fertilizer will be dropped into the upper ends of the tubes and caught by the horizontally-disposed blades of the droppers.

In order to rotate the droppers to permit the dropping of the seeds and fertilizer to the ground, I provide operating mechanism designed to be driven either from the carrying-wheels or from a check-wire, as desired. Upon the dropper-shaft 70 is keyed a ratchet-disk 75, having a number of teeth corresponding to the number of blades constituting a dropper. These teeth are designed to be engaged by a pawl 76, which when the machine is organized for wireless planting is pivotally connected at its rear end to a swinging arm 77, hinged at its lower end to a fixed part of the frame—as, for instance, a bracket 78—and having pivotal connection at its opposite extremity with a link 79, which is in turn connected to a crank-arm 80 at one end of the shaft 41. As the machine is advanced over the field the rotation of the shaft 41 will effect the oscillation of the arm 77, which will in turn reciprocate the pawl 76. In Fig. 2 this pawl is shown nearly at the limit of its stroke, and it will be evident that when it is again moved forward its beak will engage the next tooth of the ratchet-disk 75, so that the retraction of the pawl will effect just sufficient rotary movement of the dropper-shaft to cause the dropping of the seeds and fertilizer by the droppers and to present the next blades of the droppers in obstructing positions across the seed-tubes. Reverse rotation of the dropper-shaft is prevented by a spring-dog $78^a$, engaging the teeth of the disk 75. It is also desirable, for reasons which will be hereinafter explained, to provide for locking the shaft against rotation in either direction. I therefore mount upon the shaft 70 a check-wheel $79^a$, having its teeth reversed and disposed for engagement with a spring-dog $80^a$. In order to move this dog out of engagement with the check-wheel to permit the rotation of the shaft by the pawl 76, said pawl is provded with a pin 81, which as the pawl moves forward to engage a new tooth of the disk 75 contacts with the dog $80^a$ and moves the latter to an inoperative position, where it remains until the tooth of the check-wheel has moved too far to be caught by the dog.

Instead of operating the pawl 76 from the carrying-wheels it may be operated with equal facility from a check-wire. In this event the rear end of the pawl is pivotally connected, as indicated in Fig. 9, with a swinging arm 82, extending from a rock-shaft 83, journaled in suitable bearings at the rear side of the receptacle 19 adjacent to the upper edge thereof. At its opposite ends the rock-shaft 83 is provided with vibrators 84, comprising a pair of angularly-related tappet-arms 85 and 86, connected at their upper ends by a cross-bar 87, the shaft being preferably connected to the arms 86 at points slightly below the connecting-bar 87. Coöperating with one of these vibrators is a reel 88, mounted in a substantially U-shaped frame 89, retained in place beyond one end of the receptacle 19 by having its ends 90 passed through suitable brackets 91, extending in opposite directions from the receptacle, as shown in Fig. 1. The reel comprises a series of bifurcated radial arms 92, upon each of which is mounted a roller 93, which as the reel is rotated engages the tappet-arm 85 of the adjacent vibrator to swing the latter in one direction and subsequently engages the other tappet-arm 86 of the vibrator to move the same in the opposite direction, the successive presentation of these rollers to the tappet-arms serving to oscillate the vibrator and to rock the shaft 83 for the purpose of effecting the reciprocation of the pawl 76 to operate the droppers. The check-wire 94 is passed over guide-pulleys 95 and 96, having suitable guards 97 and 98, and through the bifurcated upstanding arm of the reel. As the machine advances the check-buttons 99 on the wire 94 will contact with an arm of the reel, effecting a quarter-turn of said reel and presenting another arm thereof in a vertical plane to strike the next check-button when reached.

In order to adapt the planter for strewing, one of the blades 73 of each dropper 71 is provided with a detachable connection 100 to permit its removal, as will be hereinafter made clear.

Briefly, the operation of the implement is as follows: Assuming the device to be organized for wireless check-row planting, it is drawn over the field, the rotation of the carrying-wheels effecting through the intermediate mechanism the operation of the feed devices in both the seed and fertilizer boxes. At regular intervals the reciprocation of the pawl 76 will effect a quarter-turn of the droppers, and the seeds and fertilizer will be deposited through the shoes 29 into the furrows. The quantity of material dropped will depend upon the number of tappet-arms 55 upon each of the actuating-disks 54. The gearing is such that the droppers are operated once for each complete rotation of the feed-shaft, and if, therefore, a single tappet-arm 55 is employed the seeds dropped each time will be only such as are fed to the seed-tubes by a single advance movement of each feed-disk. If on the contrary a larger number—say four—of tappet-arms are mounted on each of the actuating-disks, each feed-disk will be advanced four times to increase the quantity of seeds fourfold in the interval between each movement of the droppers. By the employment of the proper number of tappet-arms the feed may be properly regulated to adapt the device for the planting of any character of seeds.

If it is desired to employ the machine in connection with a check-wire, the pawl 76 is disconnected from the arm 77, which latter and the link 79 may be entirely removed from the machine. The pawl is then connected to the rock-shaft 83 by the swinging arm 82, and as the machine advances the arms of the reel 88 will contact successively with the check-buttons on the wire, and the consequent partial rotation of the reel will oscillate the vibrator 84 to reciprocate the pawl 76, and thus effect the movement of the droppers at such intervals as may be determined by the location of the check-buttons upon the wire.

If it is desired to strew the seeds and fertilizer instead of dropping them at intervals, the pawl 76 is either entirely removed or at least disconnected from its operating mechanism, and the removable blade of each dropper is detached, so as to leave the passages through the seed-tubes perfectly free and unobstructed. If now the machine is advanced, the feeding mechanism will operate, as heretofore explained, and the seeds and fertilizer will be deposited without interference from the dropping mechanism, attention being called to the fact that during the employment of the machine for strewing the dropper-shaft will be held stationary by the dogs $78^a$ and $80^a$ engaging the disk 75 and the check-wheel $79^a$.

For the purpose of distinguishing the boxes 21 and 22 from the seedboxes I have referred to them as "fertilizer-boxes," for the reason that in planting most seeds—as, for instance, corn and the like—it is desirable to simultaneously distribute more or less fertilizer. The machine has been constructed, however, with a view to adapting it for the planting of cotton-seeds, and for this character of planting the boxes 21 and 22 are utilized as seedboxes, since the feeding mechanism employed in connection therewith is particularly adaptable for the feeding of cotton-seeds as well as for the feeding of fertilizer. The feed-heads 64, provided with the blades 65, are very effective for forcing the cotton-seeds down through the openings 28, and the spirally-arranged stirring and propeller blades 66 are particularly useful for continuously stirring the body of cotton-seeds and for propelling the latter toward the discharge ends of the boxes.

It will of course be understood that in planting with a check-wire the frame 89, together with the reel and wire-guides mounted thereon, will be detached from the position shown in Fig. 1 and reattached to the opposite side of the machine as the latter travels back across the field in the reverse direction.

It is thought that from the foregoing the construction and operation of my combined seed-planter and fertilizer-distributer will be clearly apparent; but while the illustrated embodiment of the invention is thought at this time to be preferable I wish to be distinctly understood as reserving to myself the right to effect such changes, modifications, and variations of the illustrated structure as may be fairly embraced within the scope of the protection prayed.

What I claim is—

1. In a planter, the combination with a frame and carrying-wheels, of seedboxes, seed-tubes, feeding mechanism within the boxes, dropping mechanism within the tubes, means for operating the feeding and dropping mechanisms, pivoted shoes at the lower ends of the tubes, runners extending forwardly from the shoes, and means for retaining the shoes in different laterally-adjusted positions.

2. In a planter, the combination with a frame and carrying-wheels, of seedboxes, seed-tubes, laterally-adjustable shoes at the lower ends of the tubes, runners extending forwardly from the shoes, means for retaining the shoes in their adjusted positions, means for retaining the front ends of the runners, and feeding and dropping mechanisms in the boxes and tubes, respectively.

3. In a planter, the combination with a frame and carrying-wheels, of seedboxes, seed-tubes, shoes and runners, rotary feeding mechanism within the seedboxes, rotary dropping mechanism within the seed-tubes, a rock-shaft disposed at the rear side of the seedboxes and operatively connected to one of said mechanisms, and means for operating the rock-shaft through the advance of the planter.

4. In a planter, the combination with a frame and carrying-wheels, of seedboxes, seed-tubes, shoes and runners, feeding mechanism within the seedboxes, a dropper-shaft extending between the seed-tubes, rotary droppers within said seed-tubes, a ratchet-wheel mounted on the dropper-shaft, a pawl engaging the ratchet-wheel to effect the step-by-step rotation of the dropper-shaft, and means operated by the advance of the planter for reciprocating the pawl.

5. In a planter, the combination with the seedboxes, seed-tubes, shoes and runners, of a dropper-shaft extending between the seed-tubes, rotary droppers carried by the shaft and each comprising a series of radial blades disposed to successively obstruct the seed-tubes, a ratchet-wheel mounted on the dropper-shaft, a pawl for operating said wheel, and means operated by the advance of the planter for reciprocating the pawl.

6. In a planter, the combination with a frame and carrying-wheels, of the seedboxes, seed-tubes, shoes and runners, dropping mechanism located within the seed-tubes, a rock-shaft extending transversely of the frame and connected to the dropping mechanism, a vibrator carried by one end of the rock-shaft and having tappet-arms, and a reel disposed for operation from a check-wire and having projections arranged to engage the tappet-arms of the vibrator to vibrate the same and thereby operate the rock-shaft.

7. In a planter, the combination with a frame and carrying-wheels, of the seedboxes, seed-tubes, shoes and runners, a dropper-shaft extending between the seed-tubes, rotary droppers mounted on the shaft, a ratchet-wheel also mounted on the shaft, a pawl engaging the ratchet-wheel, a rock-shaft operatively connected to the pawl to reciprocate the same, a vibrator mounted at one end of the rock-shaft and having a pair of depending tappet-arms, a reel having radial bifurcated arms provided with rollers disposed to engage the tappet-arms of the vibrator, said reel being designed for actuation from a check-wire, and wire-guides disposed adjacent to the reel.

8. In a planter, the combination with a frame and carrying-wheels, of the seedboxes, seed-tubes, shoes and runners, a dropper-shaft, rotary droppers mounted thereon, a ratchet-wheel mounted on the shaft, a pawl and a dog both normally engaging the wheel to resist its movement in either direction, means for operating the pawl to effect the step-by-step rotation of the dropper-shaft, and means operated by the movement of the pawl for releasing the dog from the wheel as the pawl moves forward to engage the next tooth of said wheel.

9. In a planter, the combination with a frame and carrying-wheels, of the seedboxes, seed-tubes, shoes and runners, a dropper-shaft, rotary droppers and a ratchet-wheel fixed on the shaft, a pawl and a dog both normally engaging the ratchet-wheel to resist its movement in either direction, a projection on the pawl, disposed to engage the dog to effect the release of said dog as the pawl moves forward to engage the next tooth of the wheel, and means for operating the pawl.

10. In a planter, the combination with a frame and carrying-wheels, of the seedboxes, seed-tubes, shoes and runners, a dropper-shaft, rotary droppers mounted on the shaft and each having a series of radial blades one of which is removable to permit strewing, means for operating the dropper-shaft through the advance of the planter, and means for locking the dropper-shaft against rotation in either direction to prevent the rotation of the droppers when the planter is used for strewing.

11. In a planter, the combination with a frame and carrying-wheels, of the seedboxes, seed-tubes, shoes and runners, a dropper-shaft, droppers mounted on the shaft and each comprising a series of radial blades one of which is removable, a ratchet-wheel and a check-wheel mounted on the shaft, dogs engaging both of said wheels, a pawl engaging the ratchet-wheel, means for releasing one of the dogs through the movement of the pawl, and means for operating the pawl through the advance of the planter to effect the step-by-step rotation of the droppers.

12. In a planter, the combination with a frame and carrying-wheels, of the seedboxes, seed-tubes, shoes and runners, rotary feed-disks in the seedboxes, each of said disks having a circumferential series of openings, operating means for the disks, and locking devices for locking said disks, said locking devices being disposed for release by the disk-operating mechanism prior to the movement of said disks.

13. In a planter, the combination with a frame and carrying-wheels, of the seedboxes, seed-tubes, shoes and runners, rotary feed-disks within the seedboxes, a feed-shaft, tappet-arms operated by the feed-shaft to effect the step-by-step advance of the disks, locking-dogs for locking the feed-disks after each movement thereof, and trip-arms extending from the dogs into the paths of movement of the tappet-arms.

14. In a planter, the combination with a frame and carrying-wheels, of the seedboxes, seed-tubes, shoes and runners, a rotary feed-disk in each seedbox, said disk being provided with an annular series of openings, a peripheral series of notches and a series of upstanding pins, a feed-shaft, actuating-disks mounted on the feed-shaft and each provided with means for the attachment of one or more tappet-arms, a tappet-arm secured to each actuating-disk, each of said tappet-arms being disposed to engage the pins, a swinging dog associated with each disk to engage the notches thereof, and a trip-arm extending from each dog into the path of the adjacent tappet-arm.

15. In a planter, the combination with a frame, carrying-wheels, seedboxes, fertilizer-boxes, seed-tubes disposed to receive the contents of both the seed and fertilizer boxes, shoes at the lower ends of the tubes, and runners, of a feed-shaft, feeding mechanism within the seedboxes, means located at the opposite ends of the feed-shaft for operating the feeding mechanism, a feed-head mounted on the shaft within each fertilizer-box, and a series of propeller-blades extending radially from the shaft within each fertilizer-box to propel the contents thereof toward the feed-head.

16. In a planter, the combination with a frame and carrying-wheels, of seed and fertilizer boxes each of which is provided with an opening in its bottom wall, a seed-tube disposed below said openings, a feed-roller within the opening of the fertilizer-box, a rotary feed-head above the feed-roller, means for propelling the contents of the fertilizer-box toward the opening from the opposite end of the box, and feeding mechanism within the seedbox.

17. In a planter, the combination with a frame, carrying-wheels, seedboxes, and seed-tubes, of shoes pivoted at the lower ends of the seed-tubes and designed to be swung laterally, runners having their rear ends secured to the shoes and extended forwardly therefrom, means for adjustably supporting the front ends of the runners, and a rear runner-support comprising a transverse bar and brace-rods adjustably connected to the bar and secured to the rear ends of the runners.

18. In a planter, the combination with a frame, carrying-wheels, seedboxes, and seed-tubes, of funnel-shaped shoes pivoted at the lower ends of the tubes, runners adjustably secured at their front ends and having bifurcated rear ends receiving the reduced lower ends of the shoes, and a rear runner-support comprising a bar extending transversely across the frame and brace-rods adjustably secured to and depending from said bar and connected to the rear bifurcated ends of the runners.

19. In a planter, the combination with a frame and carrying-wheels, of a seedbox, feeding mechanism therein, a fertilizer-box, a shaft, means located at one end of the shaft for operating the feeding mechanism in the seedbox, and a feed-head mounted on the shaft and located within the fertilizer-box.

20. In a planter, the combination with a frame and carrying-wheels, of a seedbox and a fertilizer-box, feeding mechanism within the seedbox, a shaft located within the fertilizer-box and extended into the seedbox, means operatively connecting said shaft with the feeding mechanism, a feed-head mounted on the shaft within the fertilizer-box, and a series of propeller-blades extending radially from the shaft within the fertilizer-box to propel the contents thereof toward the feed-head.

21. In a planter, the combination with a frame and carrying-wheels, of a seedbox and a fertilizer-box, each of which is provided with an opening in its bottom wall, a seed-tube registering with both of said openings, feeding mechanism in the seedbox, a feed-roller within the opening of the fertilizer-box, a rotary feed-head above the feed-roller, and a shaft carrying said feed-head and having operative connection with the feeding mechanism and feed-roller respectively.

22. In a planter, the combination with a frame and carrying-wheels, of a seedbox and a fertilizer-box, each of which is provided with an opening in its bottom wall, a seed-tube registering with both of said openings, feeding mechanism in the seedbox, a feed-roller within the opening of the fertilizer-box, a rotary feed-head above the feed-roller, a shaft carrying said feed-head and having operative connection with the feeding mechanism and feed-roller respectively, and means for propelling the contents of the fertilizer-box toward the discharge end thereof.

In testimony that I claim the foregoing as my own I have hereto affixed my signature in the presence of two witnesses.

JAMES H. McDANIEL.

Witnesses:
W. C. McFALL,
D. C. BRATTON.